UNITED STATES PATENT OFFICE.

PETER D. GRAY, OF SAN FRANCISCO, CALIFORNIA, ASSIGNOR TO TONE RANDOLPH GRAY, OF SAN FRANCISCO, CALIFORNIA.

POROUS FILTERING-PLATE AND PROCESS OF MAKING SUCH FILTERING-PLATE.

No. 872,621.     Specification of Letters Patent.     Patented Dec. 3, 1907.

Application filed June 3, 1907. Serial No. 377,119.

*To all whom it may concern:*

Be it known that I, PETER D. GRAY, a citizen of the United States, residing at San Francisco, in the city and county of San Francisco and State of California, have invented new and useful Improvements in Porous Filtering-Plates and in Processes of Making such Filtering-Plates, of which the following is a specification.

This invention relates to porous plates used in filtering liquids and the process of producing the same, and has for its object to secure a filtering material, non-injurious, and which on account of its chemical inactivity will not rust or corrode, and which may be used for filtering purposes indefinitely. I attain this result, in the manner hereinafter described, by adding to a quantity of pure block tin a soluble substance, such as sodium chlorid, in a sufficient quantity to secure the degree of porosity desired, and then dissolving out the soluble substance. Considerable difficulty has been encountered heretofore in producing a filtering material of the required degree of porosity desired, chemically inert to the action of water, and at the same time of sufficient tensile strength to resist pressure. Through the method disclosed herein these results are obtained.

It may be remarked that instead of the sodium chlorid mentioned herein there may be used any of the soluble alkali salts or alkaline earth salts, with the exception of the caustic alkalies, as the effect of the latter would be to convert the tin into salts of stannic acid. It is therefore not my desire to confine myself solely to the use of sodium chlorid.

Inasmuch as different degrees of porosity of the filtering material may be desired under different conditions, it is impracticable to state as a general rule for all instances the exact proportion of sodium chlorid to block tin. It will be sufficient to say that the filtering material may be made more or less porous by the greater or less amount of sodium chlorid used, the more sodium chlorid used tending to make the material more porous, and the less sodium chlorid used tending to make the material less porous. In the following description it may be assumed that ten parts of pure block tin are used to one part of sodium chlorid.

A quantity of pure block tin is placed in a suitable receptacle and subjected to a sufficient degree of heat to fuse it; it is then stirred until the whole mass is in a liquid form. Sodium chlorid is then added and the two ingredients thoroughly intermixed by again stirring until homogeneity is secured. The mixture while still in its liquid form is poured into a suitable mold and allowed to cool under high pressure until it has solified, the solidification usually taking place in from three to five minutes. The plate is further compressed by passing it through rollers. The plate is then placed in boiling water and allowed to remain until the sodium chlorid has been completely dissolved out. Practice has demonstrated that the dissolving out of the sodium chlorid is materially hastened by an occasional change of water and by the addition of a small quantity of alum. By the process described a homogeneous porous filtering plate of pure block tin is obtained.

Having thus fully described my invention, what I claim as new, and desire to secure by Letters Patent, is:

1. A porous filtering plate composed of pure block tin made porous by the admixture of a soluble substance, substantially as described.

2. A porous filtering plate composed of pure block tin made porous by the admixture of a soluble substance and the dissolving out of the soluble substance, substantially as described.

3. The process of making a porous filtering plate composed of pure block tin made porous by an admixture of a soluble substance, by compressing and molding the said materials into shape and finally by dissolving out the said soluble substance, substantially as described.

4. The process of making a homogeneous porous filtering plate of pure block tin, first by admixing therewith a soluble substance, second by molding the two ingredients into shape, and third by dissolving out the soluble substance, substantially as described.

PETER D. GRAY.

Witnesses:
 TONE R. GRAY,
 FRANCIS ST. J. FOX.

It is hereby certified that in Letters Patent No. 872,621, granted December 3, 1907, upon the application of Peter D. Gray, of San Francisco, California, for an improvement in "Porous Filtering-Plates and Processes of Making Such Filtering-Plates," an error appears in the printed specification requiring correction, as follows: In line 64 the word "solified" should read *solidified;* and that the said Letters Patent should be read with this correction therein that the same may conform to the record of the case in the Patent Office.

Signed and sealed this 4th day of February, A. D., 1908.

[SEAL.]

C. C. BILLINGS,
*Acting Commissioner of Patents.*